UNITED STATES PATENT OFFICE.

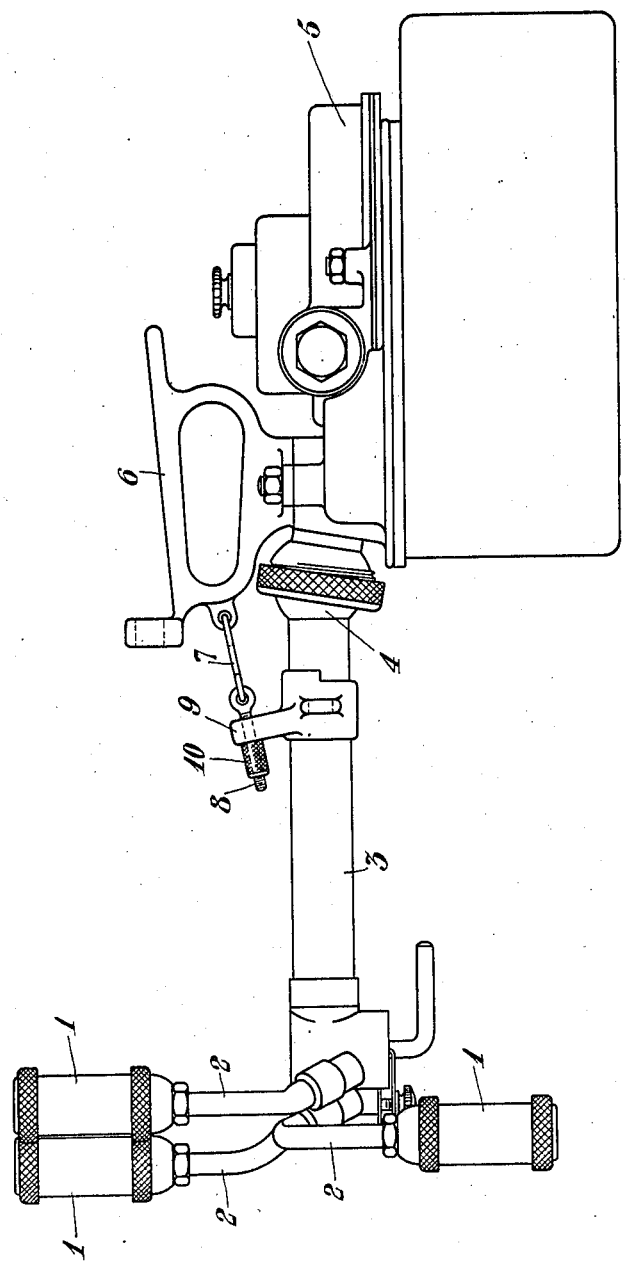

GUSTAF EMIL JONSSON, OF HALMSTAD, SWEDEN, ASSIGNOR TO AKTIEBOLAGET MJÖLK-NINGSMASKINEN MANUS, OF NORRKÖPING, SWEDEN.

MILKING-MACHINE.

1,190,294.  Specification of Letters Patent. Patented July 11, 1916.

Application filed October 21, 1915. Serial No. 57,187.

*To all whom it may concern:*

Be it known that I, GUSTAF EMIL JONSSON, a subject of the King of Sweden, residing at Halmstad, in the Kingdom of Sweden, have invented a new and useful Improvement in Milking-Machines, of which the following is a specification.

My invention relates to suction-operated milking machines of the kind in which the milk receptacle is carried by the cow in a strap, belt or the like, and in which the teat-cups are connected by means of flexible tubes, preferably rubber hoses, with a solid tube serving as milk conduit, which tube is pivotally jointed to a part which serves as a common support for different parts of the machine and also as a lid for the milk receptacle. The manner of operation of such a machine is characterized, among other things, by this that when the teats are emptied, the teat-cups lose their hold on the same and drop down and remain hanging by the flexible tubes, which, actuated by the weight of the teat-cups, become folded so that they are shut off and prevent the outside air from entering the suction conduits of the machine. As long as all four of the teat-cups are in operation, that is to say, are attached to the teats, they are together strong enough to support the movable milk-tube extending between the teat-cups and the common support above referred to, but if one or two of the teat-cups drop from the teats, the weight of the same together with the weight of the milk-tube will exert a downward pull on the teat-cups still in operation, and as a result these teat-cups will lose their hold and drop from the teats before these are emptied, or the teat-cups will slide downward along the teats, stretching the same as well as the flexible suction hoses, which in turn will cause the cups hanging down to descend and thus obtain support against the floor or on some other solid part, so that the bend of the hose will be straightened out and the outside air thus be admitted into the suction pipes.

This invention has for its object to remove this disadvantage, and is broadly characterized by this that the movable milk-tube is supported by one or more links, springs or the like, secured between the milk-tube and the common support to which it is attached. The invention consists in special arrangements and features further described herein below and pointed out in the claims.

The accompanying drawing illustrates an embodiment of the invention.

The teat-cups 1 are connected by means of the flexible suction hoses 2, with the suction line or the milk-tube 3, which is movably connected by means of the ball and socket joint 4 with the common support 5 serving as a lid for the milk receptacle. To a handle 6 on the said support a link 7 is hinged, said link being also movably connected with a screw 8 passing through a projecting arm 9 on the milk-tube. A nut 10 is threaded on the screw and rests against the arm 9, thus securing the screw 8 and the link 7 to the arm, and also allowing the milk-tube 3 to be adjusted in the desired position, which is easily accomplished by turning the nut 10 in the one or the other direction.

As regards the construction of the described arrangement, this may be varied in various respects without departing from the principle of the invention stated above. Instead of the nut there could for instance be used an eccentric, a wedge or the like for effecting the raising or lowering of the milk-tube 3, and the entire supporting device for the milk-tube could, if desired, be arranged on some other solid stationary part of the machine than the support 5, for instance on the milk receptacle itself.

I claim:

1. In a milking machine operated by suction and adapted to be carried by the cow by means of straps, the combination of a lid forming a common support for all parts of the machine, a tube movably connected with the lid, suction teat-cups secured to the outer end of said tube by means of flexible hoses, and a link between the lid and the tube supporting the latter, substantially as and for the purpose set forth.

2. In a milking machine operated by suction and adapted to be carried by the cow by means of straps, the combination of a lid forming a common support for all parts of the machine, a tube movably connected with the lid, a projecting arm on said tube, suction teat-cups secured to the outer end of said tube by means of flexible hoses, a link secured to the lid, and an adjustable connection between said link and said arm, substantially as and for the purpose set forth.

3. In a milking machine operated by suction and adapted to be carried by the cow by means of straps, the combination of a lid forming a common support for all parts of the machine, a tube movably connected with the lid, a projecting arm on said tube, suction teat-cups secured to the outer end of said tube by means of flexible hoses, a link secured to the lid, a screw secured to the link and projecting through the arm, and a nut on said screw, substantially as and for the purpose set forth.

GUSTAF EMIL JONSSON.